C. W. DAVIS.
TERMINAL FOR ELECTRIC CABLES.
APPLICATION FILED AUG. 3, 1908.

926,857.

Patented July 6, 1909.

WITNESSES:
Francis J. Tomsuun
J. Herbert Bradley.

INVENTOR
Charles W. Davis.
by Christy & Christy
Atty's

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURG, PENNSYLVANIA, A CORPORATION OF PENNSYLVANIA.

TERMINAL FOR ELECTRIC CABLES.

No. 926,857.   Specification of Letters Patent.   Patented July 6, 1909.

Application filed August 3, 1908. Serial No. 446,621.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Terminals for Electric Cables, of which improvement the following is a specification.

The invention described herein relates to certain improvements in terminal heads for protecting the portion of the cable stripped of the sheath and insulation for connection with the aerial line.

The invention is hereinafter more fully described and claimed.

Figure 1:
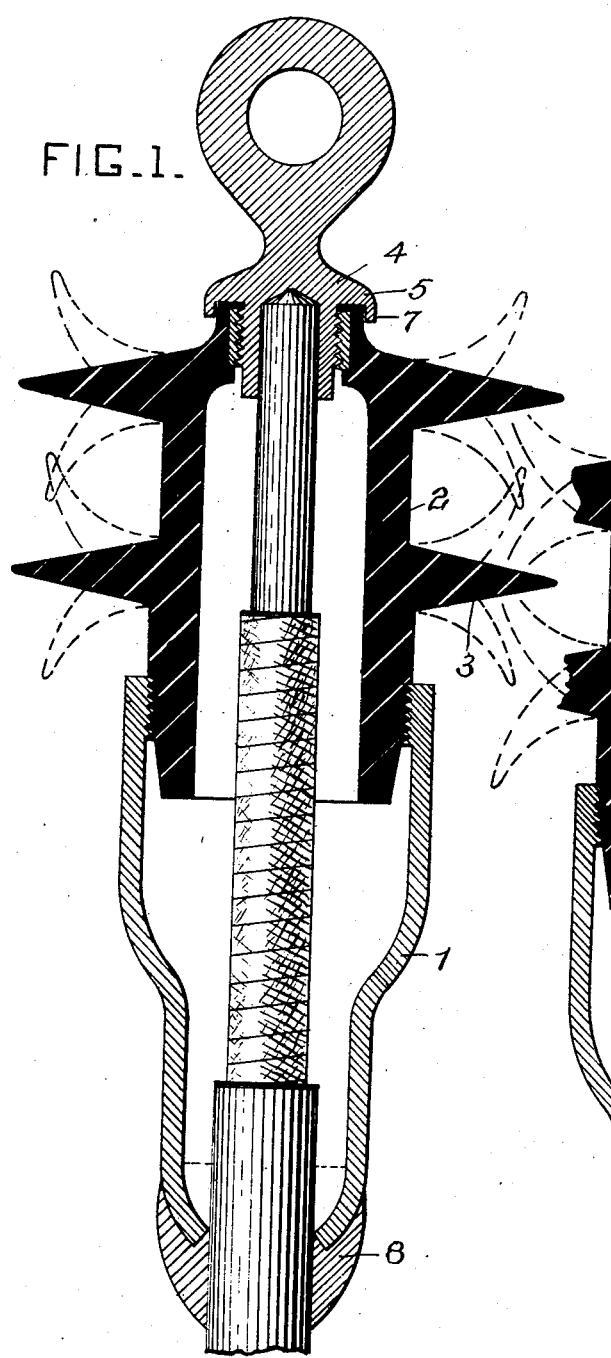
Figure 2:
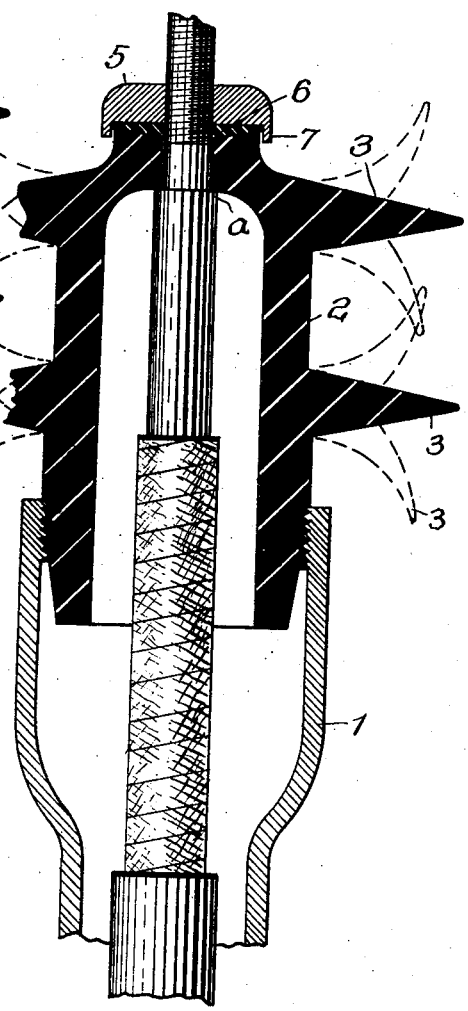

In the accompanying drawings forming a part of this specification, Figure 1 is a sectional elevation of my improved terminal head; and Fig. 2 is a similar view illustrating a modification.

In the practice of my invention the lead sheath and the insulation are removed from the cable for a suitable distance and the metal thimble 1 and sleeve 2 are slipped onto the cable. The sleeve 2 is formed of insulating material which is provided with one or more petticoats 3 to protect the joint between the thimble and insulator or the point of emergence of the conducting element from the insulating sleeve, from the weather. As shown this petticoat may extend out at right angles from the axis of the insulator or as indicated in dotted lines may curve downwardly toward the point which is to be protected from the weather. After the thimble and sleeve have threaded on the cable, the bared end of the conductor is electrically connected with conducting link or member 4 adapted to be connected to the aerial line. This link is provided with a socket into which the end of the conductor is sweated. This link is then secured to the insulating sleeve, preferably by the engagement of threads on the link with internal threads on the sleeve. The link is provided with a disk portion 5 preferably made in the form of a flange, and adapted to bear tightly on the insulating sleeve, where the conducting element emerges therefrom and protect the joint between the sleeve and conducting element. In lieu of employing the conducting link or member 4, the conducting core of the cable may extend entirely through the insulating sleeve as shown in Fig. 2. In such case the disk for sealing the end of the sleeve is carried by the conducting core. The disk may be attached to the core in any suitable manner, as for example the core may be threaded and the disk formed with a threaded opening, so that it may be screwed down onto the end of the sleeve. If desired a packing washer 6 may be interposed between the disk and the end of the sleeve. In order to further protect the joint between the sleeve and disk, the latter may be provided with a rim 7 extending along and inclosing a neck or extension on the end of the sleeve. When employing the construction shown in Fig. 2, the conducting core is formed with a shoulder $a$ between which and the disk the insulating sleeve is clamped. After the sleeve has been connected to the conducting core, the thimble is secured to the opposite end of the sleeve preferably by a threaded joint and the thimble secured to the sheath by a wiped soldered joint 8.

It will be observed that it is characteristic of the invention described herein that an insulating sleeve surrounds and incloses the stripped conducting core of the cable, and is closed at one side by the element connecting it to the sheath of the cable and at the opposite end by means which are carried by or form a tight joint with the conducting element.

It will be observed that the conducting element 4 has a bearing against the end of the cable conductor, and that the insulating sleeve and the thimble are connected respectively to each other, and to the conducting element 4 and the sheath of the cable. So that these parts or elements will form a connecting link from the end of the conductor to the sheath, preventing the latter from slipping down along the conductor when the cable is in a vertical condition.

I claim herein as my invention:

1. A terminal structure having in combination a thimble adapted to be secured to the sheath of a cable, a conducting element for connecting the cable conductor to an aerial, a disk carried by the conducting element, and a sleeve formed of insulating material interposed between the thimble and disk and adjustably connected to the thimble.

2. A terminal structure having in combination a thimble adapted to be secured to the sheath of a cable, a conducting element for connecting the cable conductor to an aerial, a disk carried by the conducting element, and a sleeve formed of insulating material interposed between the thimble and disk and adjustably connected to the thimble, the disk having a rim adapted to protect the joint between the sleeve and disk.

3. A terminal structure having in combination a thimble adapted to be secured to the sheath of the cable, a conducting link adapted to be electrically connected with the conductor of the cable, a disk carried by the link, and a sleeve formed of insulating material interposed between the thimble and disk, and adjustably connected to the thimble, said disk closing the end of the sleeve.

4. A terminal structure for electric cables having in combination a thimble secured by a wiped joint to the sheath of the cable, a conducting element for connecting the cable conductor to an aerial, an annular non-conducting sleeve secured to and carried by one end of the thimble and a disk integral with the conducting element and adapted to form a tight joint with the end of the sleeve around the conducting element.

5. A terminal structure for electric cables having in combination a thimble secured to the sheath of the cable, a conducting element for connecting the cable conductor to an aerial and secured to such conductor, an annular non-conducting sleeve connected to the conducting element and the thimble and a disk integral with the conducting element and adapted to form a tight joint with the end of the sleeve around the conducting element.

In testimony whereof, I have hereunto set my hand.

CHARLES W. DAVIS.

Witnesses:
CHARLES BARNETT,
FRANCIS J. TOMASSON.